(12) United States Patent
Paton et al.

(10) Patent No.: US 7,985,365 B2
(45) Date of Patent: Jul. 26, 2011

(54) FUNCTIONAL SURFACE SHAPING TECHNIQUES FOR POLYMER COMPOSITE COMPONENTS

(75) Inventors: Rowan Johnson Paton, Brighton (AU); Paul Falzon, Williamstown (AU); Andrew Beehag, Glebe (AU)

(73) Assignee: Cooperative Research Centre for Advanced Composite Structures Limited, Victoria (AU)

( * ) Notice: Subject to any disclaimer, the term of this patent is extended or adjusted under 35 U.S.C. 154(b) by 693 days.

(21) Appl. No.: 10/572,227

(22) PCT Filed: Sep. 17, 2004

(86) PCT No.: PCT/AU2004/001272
§ 371 (c)(1),
(2), (4) Date: Mar. 8, 2007

(87) PCT Pub. No.: WO2005/025836
PCT Pub. Date: Mar. 24, 2005

(65) Prior Publication Data
US 2007/0222103 A1    Sep. 27, 2007

(30) Foreign Application Priority Data
Sep. 18, 2003  (AU) .................. 2003905071

(51) Int. Cl.
*B29C 59/02* (2006.01)
(52) U.S. Cl. ......... 264/320; 264/319; 264/322; 264/259
(58) Field of Classification Search .................. 264/320, 264/139, 299, 319, 322, 293, 294
See application file for complete search history.

(56) References Cited

U.S. PATENT DOCUMENTS

| | | | |
|---|---|---|---|
| 5,264,059 A | 11/1993 | Jacaruso et al. | |
| 6,869,557 B1 * | 3/2005 | Wago et al. | 264/293 |
| 7,132,167 B2 * | 11/2006 | Stebnicki et al. | 428/412 |
| 2002/0114927 A1 | 8/2002 | Brossman et al. | |
| 2003/0068513 A1 | 4/2003 | Kubota et al. | |
| 2003/0107203 A1 | 6/2003 | Bauer et al. | |
| 2003/0108718 A1 | 6/2003 | Simon et al. | |
| 2004/0130066 A1 * | 7/2004 | Koide et al. | 264/255 |

(Continued)

FOREIGN PATENT DOCUMENTS

DE    20119422 U1    3/2002

(Continued)

OTHER PUBLICATIONS

Lawson, D.E., "Thermoset Parts With Smooth Thermoplastic Surfaces," Plastic Engineering, Society of Plastics Engineers, Inc., Greenwich, Connecticut, US, vol. 343, No. 3, Mar. 1, 1978, p. 63.

(Continued)

*Primary Examiner* — Matthew J Daniels
*Assistant Examiner* — Yana Belyaev
(74) *Attorney, Agent, or Firm* — David A. Farah; Sheldon Mak & Anderson PC

(57) ABSTRACT

A method of creating a functional utility-surface on a thermoset composite component, including the steps of: fixing the position of a cured thermoset polymer composite component, the thermoset polymer composite component having a thermoplastic polymer surface layer attached to at least a portion of one surface thereof, the thermoset polymer composite component being fixed in position to allow access to the thermoplastic polymer surface layer; and shaping the thermoplastic polymer surface to form a functional utility-surface.

29 Claims, 3 Drawing Sheets

U.S. PATENT DOCUMENTS

2004/0231790 A1* 11/2004 Hou et al. .................. 156/307.1

FOREIGN PATENT DOCUMENTS

| DE | 10155312 A1 | 5/2003 |
|---|---|---|
| EP | 156536 A | 10/1985 |
| EP | 398447 A | 11/1990 |
| JP | 62-164737 | 7/1987 |
| JP | 63-297006 | 12/1988 |
| JP | 09-193244 | 7/1997 |
| JP | 11-291345 | 10/1999 |
| JP | 2000-143847 | 5/2000 |
| JP | 2001-301037 | 10/2001 |
| JP | 2001-305750 | 11/2001 |
| WO | WO 02/42040 A | 5/2002 |
| WO | WO 02/078927 A | 10/2002 |
| WO | 03/011573 A1 | 2/2003 |

OTHER PUBLICATIONS

Cooperative Research Centre for Advanced Composite Structures Limited, "Supplementary European Search Report" issued by European Patent Office in corresponding European Patent Application No. 04761307.0, Feb. 5, 2010.

* cited by examiner

FUNCTIONAL SURFACE SHAPING TECHNIQUES FOR POLYMER COMPOSITE COMPONENTS

CROSS-REFERENCE TO RELATED APPLICATIONS

This application claims priority from International Patent Application PCT/AU2004/001272, entitled "Functional Surface Shaping Techniques for Polymer Composite Components," filed Sep. 17, 2004, which claims priority from Australian Patent Application 2003905071, filed Sep. 18, 2003, the contents of which are incorporated by reference herein in their entirety.

FIELD OF THE INVENTION

The present invention relates to thermoset polymer composite components. In particular, the invention relates to altering the surface profile or thickness of a thermoset polymer composite components. In one particular application, the invention extends to the creation of specific functional features on a surface of the composite component, in order to assist in assembly of that component into a structure.

BACKGROUND OF THE INVENTION

Fibre reinforced polymer components, otherwise known as polymer composite components, consist of reinforcing fibres held together with a polymer resin, often known as the matrix. This matrix can be a thermosetting polymer such as an epoxy resin, in which case the composite component can be called a thermoset composite component, or a thermoplastic polymer such as polyamide or polyetheretherketone, in which case the component can be called a thermoplastic composite component. It should be noted that a thermoset composite component may contain small amounts of thermoplastic polymer, for instance as a surfacing film, a resin additive, or a binder agent. A thermoplastic composite component may in the same way contain small amounts of thermoset polymer, for instance in a core or insert.

One of the best known thermoset composites is continuous carbon fibre reinforced epoxy (carbon-epoxy). This material is used to make much of the structure of the latest passenger aircraft. The material has many advantages, and the resulting components are strong, stiff, lightweight and fatigue resistant. However the components can be expensive to make and assemble. A key reason for the high cost of the assembly process is the difficulty of producing components with tight dimensional control on all surfaces, and of producing components with intricate surface shapes.

Most large structural thermoset composite components such as carbon-epoxy components are made using open (one-sided) moulds. A vacuum bag or other soft tooling surface is used to compact the reinforcing fibres and unreacted resin against the stiff mould. The whole assembly is then cured at elevated temperature. Due to variations in the thickness, or the weave structure of the reinforcements, or variations in the resin content, or variations in local temperature or pressure during the moulding process, the surface quality or texture of the "bag-side" surface of the resulting parts may vary substantially. More importantly, the local thickness of the part may vary significantly, leading to variation in the surface contour of the laminate, especially in the bag-side surface. This causes the manufacturer to either accept loose tolerances for the dimensions of the assembled structure, or to incur considerable difficulty and increased expense in the assembly of such composite laminates with other components. Massive and stiff assembly jigs may be necessary to hold the components in position while shimming is carried out to compensate for the local irregularities of the surface contour of the components.

A process which could be used to produce or shape structural thermoset composite components, made using open moulds, with accurate dimensions on any surface would be therefore be very desirable.

Shimming as described above can be carried out using solid sheets or laminates chosen to match the thickness of the gap to be filled. Another current method of shimming involves the use of "liquid shim", which requires that the assembled components be held rigidly while the gap between them is filled with a thermosetting liquid resin that is then cured. In this case assembly requires a rigid and accurate tooling fixture to accurately place the components prior to curing of the liquid shim. The components then normally have to be removed and replaced prior to assembly, thus increasing the time and expense of the assembly operation. Therefore shimming using current techniques is not an ideal solution to the problem of thermoset composite components with loose dimensional tolerances.

A second related need, in the assembly of structural composite components, is for surface features to allow accurate location of adjacent components in joining operations. Such location points can be used to greatly simplify the process of assembly. Such features are also used for operations such as drilling and routing, in order to accurately locate the position of the component in machining operations. While it is possible to include location features such as depressions or steps in the surface of a cured thermoset composite component by building such features into the mould surface, this is generally not done due to the practical requirements of moulding, such as easy part removal, and the need for robust moulds with a long working life. The inclusion of some surface features in the mould surface may also detrimentally affect the structural properties of the resulting component, for example by causing local disruption of the reinforcing fibre paths. While it is often impractical, as explained above, to make thermoset composite components with location features on the mould surface, it is even more difficult or impractical to produce thermoset composite components with such location features on the bag side surface, due to the absence of a fixed or solid tooling surface against this surface of the curing component.

Another need is for a process to produce thermoset composite components with local surface features which cannot be made in a one-piece open mould. An example of these is a surface feature which would require negative "draft" in a normal open mould, that is, where the geometry of the required mould surface is such that the cured thermoset composite component would be impossible to remove from the mould without damage to the mould or the component. Such a feature might be desirable in order to provide a means of joining a second component through a snap-in joint. A similar need is for a process to enable a greater variety of external shapes in thermoset composite components made by a continuous production process such as pultrusion. The necessary mould shape normally used in such processes precludes the moulding of anything but the simplest-shaped thermoset composite component.

There is currently a process by which the surface of a thermoset composite component can be reshaped. This process requires additional uncured thermosetting resin or uncured thermosetting composite material to be placed against the surface of the component, shaped, and cured. This process requires that the additional material forms a good bond with the original surface, which can be difficult. This process also results in a thermoset composite component with additional mass, and the likelihood of an unsightly joint between the original component and the added material.

It is therefore desirable for the present invention to alleviate, at least in part, one or more of the above problems by providing a method for reshaping the surface of a thermoset composite component. Advantageously, the process may be used to prepare a working surface that enables the thermoset composite component to be easily joined with other components. More advantageously, the process is highly adaptable to a number of configurations and end uses, only some of which have been detailed above.

SUMMARY OF THE INVENTION

Broadly, the present invention involves a method for providing a precise component thickness and surface shape on a thermoset composite component, that is, a component made largely of thermoset polymer and reinforcing fibres, by altering the thickness and/or surface shape of a thermoplastic polymer surface layer on the thermoset composite component at specific locations.
In one aspect the invention provides a method of creating a functional utility-surface on a thermoset composite component, including the steps of:

fixing the position of a cured thermoset polymer composite component, the thermoset polymer composite component having a thermoplastic polymer surface layer attached to at least a portion of one surface thereof, the thermoset polymer composite component being fixed in position to allow access to the thermoplastic polymer surface layer; and shaping the thermoplastic polymer surface to form a functional utility-surface.

An advantage of this improved process is the ability to generate surface features that may not be practical to include during the initial processing of the component, due to the necessity to allow easy removal of the component from the processing mould.

An additional advantage is that these surface features can be included without compromising the structural design or performance of the original composite component.

Re-profiling a localised area layer of the thermoplastic utility-surface profile enables the component to cooperate accurately with other components and/or assembly fixtures, or provides other advantages in the subsequent processing or application of the component.

Preferably, the thermoset composite component consists largely of a thermoset polymer composite material, with a thermoplastic polymer layer on at least the part of the surface to be reprofiled. While the thermoplastic polymer layer may be attached subsequent to curing of said thermoset polymer composite, the thermoplastic polymer surface layer is preferably integrated by collocating a thermoplastic polymer with an uncured thermosetting polymer composite before the thermosetting polymer cures, such that the thermoplastic polymer and the thermosetting polymer at least partially interpenetrate. One method of providing a thermoset polymer component with a partially interpenetrating thermoplastic polymer surface layer is the subject of International Patent Application No. PCT/AU02/01014, the contents of which are incorporated herein by reference.

The method for providing a utility surface will involve selection of a thermoset composite component with a thermoplastic polymer surface layer, where generally the layer has sufficient thickness to allow the desired surface profile to be formed. Where this is not the case, the method may also involve the addition of extra thermoplastic polymer, either pure polymer or polymer in combination with other materials, before or during this operation.

Advantageously, the above process would allow a thermoplastic polymer surface that has been damaged or otherwise altered to be rebuilt or refinished to near-original dimensions.

According to a first embodiment of the invention, the step of re-profiling includes:

heating the thermoplastic polymer surface on the thermoset composite component, at least in the area to be re-profiled, to the flow-temperature, a temperature at which the thermoplastic polymer can be made to flow under pressure, and pressing a shaped tool against the thermoplastic polymer surface of the thermoset composite component, the tool having a shape that complements the desired utility-surface profile, wherein said processing causes the thermoplastic polymer surface layer to flow about the shaped tool to thereby reprofile the thermoplastic polymer surface of the thermoset composite component with the selected utility-surface profile.

The shaped tool may be heated to the temperature at which the thermoplastic polymer can be made to flow such that pressing the shaped tool against the thermoplastic polymer surface layer simultaneously heats the thermoplastic polymer surface layer above the temperature at which it can be made to flow. The method may further include cooling the shaped tool when in contact with the reprofiled thermoset composite component such that the thermoplastic polymer is cooled to below the temperature at which it can be made to flow easily. Such cooling prevents unwanted changes in the utility-surface due to further flow of the thermoplastic polymer, e.g. under gravity, subsequent to removal of the tool from contact with the thermoplastic polymer layer. This first embodiment of the invention takes advantage of the fact that the thermoplastic polymer can be made to flow at elevated temperature and, upon cooling, resolidified. As an alternative, the step of heating the thermoplastic polymer surface layer may occur prior to pressing with the shaped tool. In this instance the tool may not be heated, or may be heated to a temperature below the flow-temperature of the thermoplastic, thus removing the need for a cooling step.

The shaped tool may be made of a material that can easily be used to raise or lower the temperature of the thermoplastic, such as a polished steel or aluminium. The tool will also be finished so that it can easily release from the thermoplastic, and may be surfaced accordingly. An additional part of the above process may include preparing the surface of the shaped tool with a release agent or other substance to aid in removing the tool from the formed thermoplastic surface.

Advantageously, using the first aspect of the invention, external components can be impressed into the surface during the reprofiling operation. Such external components could include metal washers, temporary location features, or devices which assist with subsequent welding such as heating elements or thickness control devices. More advantageously those external components may be sensors, which for example may be used to monitor the condition of the joint following assembly or welding. Physical features which constitute part of a sensor or allow later insertion of a sensor can also be created. Dams, which limit the flow of the thermoplastic upon reheating may also be included by this means.

More advantageously, the shaped tool used in the first embodiment of the invention may be a second component which will be subsequently joined with the reprofiled thermoset composite component at the location of the utility-surface. Preferably, that second component has been heated to allow the thermoplastic polymer layer to flow.

According to a second embodiment of the invention, the step of reprofiling includes:

removing a selected part of the thermoplastic polymer surface layer physically or by chemical means such that the remaining thermoplastic polymer defines the selected utility-surface profile.

Advantageously, where a defined component thickness is required, the initial thickness of the thermoplastic polymer surface layer on the thermoset composite component can be greater than the thickness variability expected in the thermoset composite component after initial processing, for example in open moulds. This allows the defined component thickness to be achieved using the first or second embodiments of the invention. Therefore removal or reprofiling of material can be used to alter the local thickness of the component.

More advantageously, where the thickness of the thermoplastic polymer surface layer is greater than that required to achieve a defined component thickness after reprofiling, or create a surface feature, the alteration of the surface profile can be achieved without compromising the properties or structural performance of the thermoset composite component.

Advantageously, specific features can be made in the thermoplastic surface using the first or second embodiments of the invention, including, but not limited to, energy directors, steps, ribs, conical targets, drill pilots, lettering and numbering. Shapes or surface forms that aid in subsequent operations, such as the welding of components by melting the thermoplastic polymer surface layers of adjacent such components, may also be created using the first or second embodiments of the invention. For example, raised areas may also be created that allow sealing against other components after assembly.

Advantageously, a second component may be attached to the first component, by creating features in the thermoplastic surface of the first component using the first or second embodiments of the invention to support that attachment, for example snap locking features and precision location points. More advantageously the second component may be a thermoset composite component with a thermoplastic polymer surface layer, which may also have features in its surface created according to the first or second embodiments of the invention. Furthermore, these components may be later welded together by applying heat and pressure to the joint area, and subsequent cooling once the adjacent thermoplastic layers have melded.

In the first and second embodiments of the invention, the "thermoplastic polymer" may refer to a pure thermoplastic polymer, a copolymer or a polymer blend. The thermoplastic polymer may further comprise some percentage of filler, fibre or other material within the thermoplastic material.

The invention in another aspect provides a thermoset composite component having a functional utility surface formed by the method described above. The invention may also provide two or more thermoset composite components joined by a utility surface formed by the method described above.

DESCRIPTION OF EMBODIMENTS OF THE INVENTION

Figure 1A:
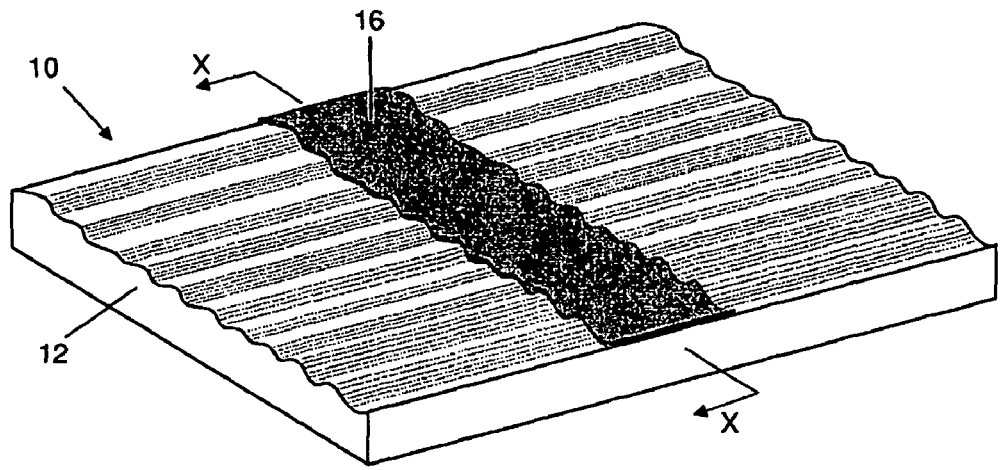
FIG. 1A is a perspective view of a cured thermoset composite component having a thermoplastic polymer surface layer on a thermoset polymer composite substrate.

The method according to the invention is suitable for use with polymer composite components 10, such as that shown in FIG. 1A, with a substrate 12 made up of a thermoset composite, and a thermoplastic polymer surface layer 16 attached to the substrate 12. A desired utility-surface profile is selected to be complementary to the shape of the another component with which the component 10 is to cooperate, or by other criteria.

Figure 1B:
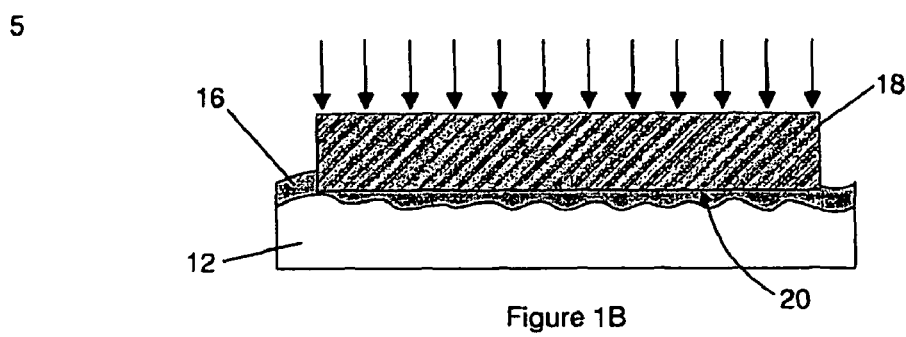
FIG. 1B is a cross-sectional view of the component of FIG. 1A undergoing re-profiling in accordance with the first embodiment of the invention.
Figure 1C:
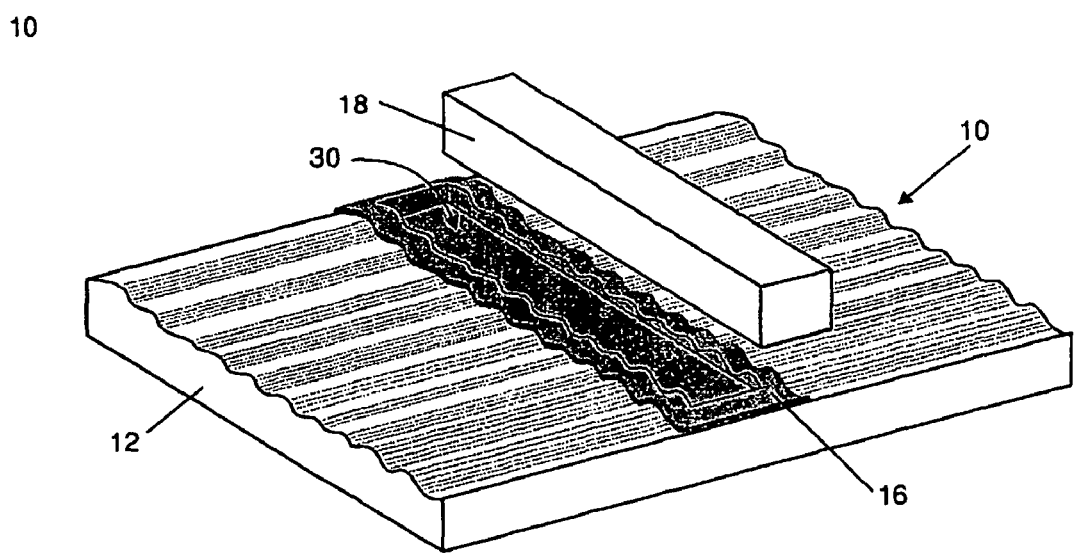
FIG. 1C is a perspective view of the thermoset composite component of FIG. 1B subsequent to re-profiling with the desired utility surface.

According to the first embodiment, the re-profiling step involves heating the thermoplastic polymer layer 16 to a temperature at which the thermoplastic polymer can be made to flow. At this temperature, the thermoplastic polymer surface may be reshaped as indicated in FIG. 1B, and then cooled to solidify in the newly formed shape. Reshaping is effected by contacting a shaped surface 20 of a shaped tool 18 with the thermoplastic polymer layer 16 under pressure e.g. 500 kPa so that the thermoplastic polymer layer 16 flows about the shaped tool and takes on the shape of the shaped tool surface 20. A shaped working surface 30 is formed as shown in FIG. 1C.

This method of providing the working surface 30 may involve the thermoplastic polymer layer 16 being heated to the flow-temperature prior to being contacted by the shaped tool 18. In such a case, the shaped tool 18 may not be heated or may be heated to a temperature less than the flow-temperature. Having the shaped tool 18 at a temperature less than the flow-temperature causes solidification of a portion of the thermoplastic polymer layer 16 adjacent the shaped surface 20 such that, once shaped, the working surface 30 does not change due to further flow of the thermoplastic polymer, for instance, under gravity.

Figure 2A:
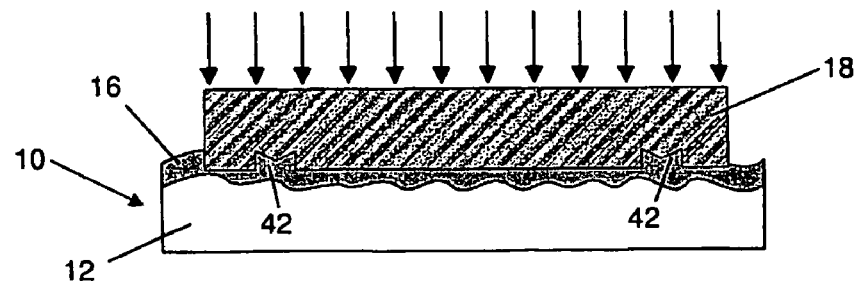
FIG. 2A is a cross-sectional view of the component along the line X-X of FIG. 1A undergoing re-profiling in accordance with the first embodiment of the invention with the tool shaped to form the utility surface with functional features.
Figure 2B:
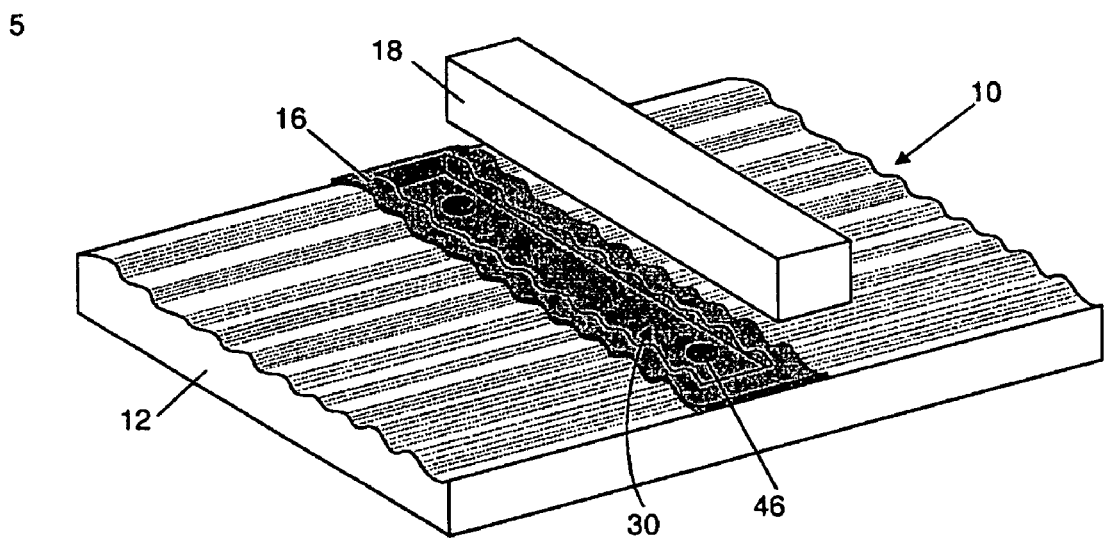
FIG. 2B is a perspective view of a component subsequent to re-profiling with the desired utility surface including functional features.

As shown in FIG. 2A, the shaped surface 20 of the shaped tool 18 may include recesses 42. When surface 20 is pressed against the thermoplastic polymer layer 16 at temperatures greater than the flow-temperature, the thermoplastic polymer flows into the recesses 42. The resulting working surface 30 includes projections 46 (FIG. 2B). Such projections 46 are exemplary of the functional features which may be introduced into the working surface 30. The functional features may be added to the working surface 30 to assist with component alignment during subsequent working of the component 10, to assist with alignment of the component 10 with a cooperating component prior to welding or binding, or may otherwise assist in further operations on the component or applications of the component.

Figure 3A:
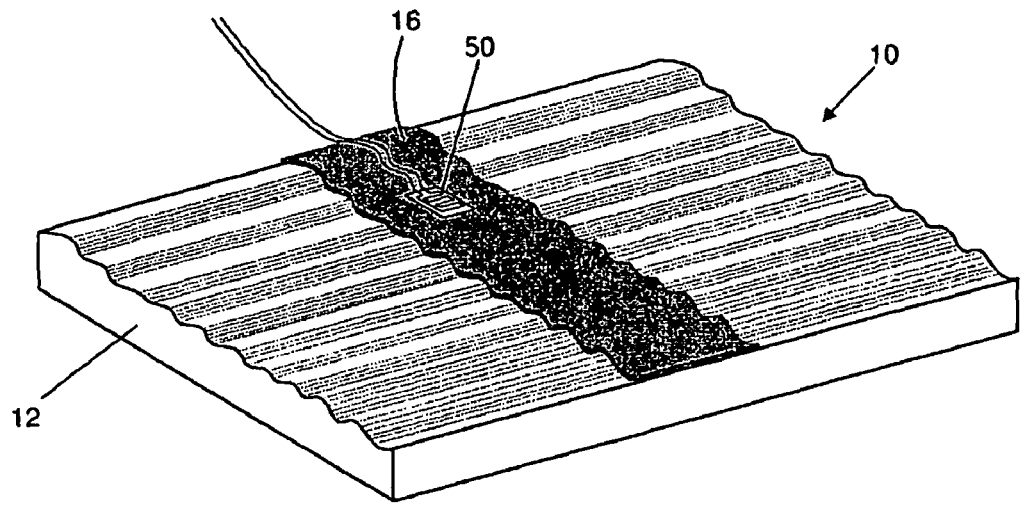
FIG. 3A is a perspective view of a composite component of FIG. 1A prior to re-profiling with an impressible external component in accordance with the first embodiment of the invention.
Figure 3B:
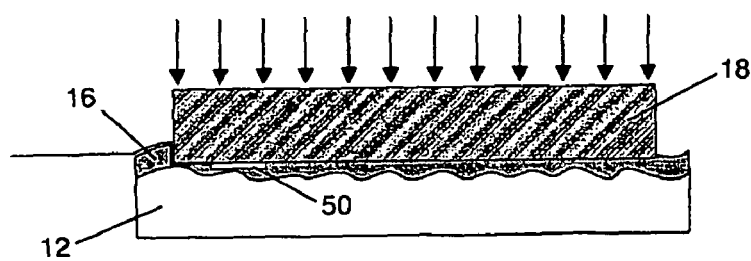
FIG. 3B is a cross-sectional view of the component of FIG. 3A undergoing re-profiling with the inclusion of an impressible external component in accordance with the first embodiment of the invention.
Figure 3C:
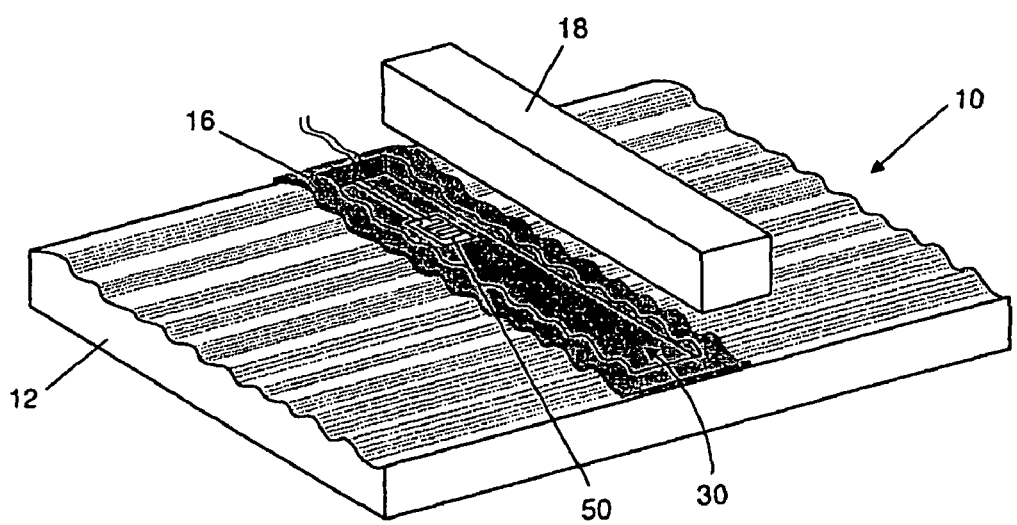
FIG. 3C is a perspective view of the component of FIG. 3B subsequent to re-profiling with a formed utility surface and an impressible external component embedded into the utility surface.

When the thermoplastic polymer layer 16 is heated above the flow-temperature, functional external components may be impressed into the thermoplastic polymer layer 16 during re-profiling with the shaped tool 18 (FIGS. 3A and 3B). The functional external components are placed on the surface of the thermoplastic polymer layer such that when the thermoplastic polymer is heated above the flow-temperature and impressed with the shaped tool 18, the thermoplastic polymer flows about the functional external components to embed them into the thermoplastic polymer layer 16 below the formed working surface 30. The functional members may be metal washers, temporary location features, devices which assist with subsequent welding, e.g. heating elements or thickness control devices, or sensors 50 which, for example, may be used to monitor the health of a joint between two components following assembly or welding. Alternatively, this method may be used to introduce features that permit the insertion of a sensor subsequent to the formation of the working surface 30. Dams, which limit thermoplastic flow upon heating, may also be included.

In utilising the first embodiment, the shaped tool 18 may be a second component with which the component 10 is to cooperate for assembly or welding for example. This second component may remain in position or be removed for later assembly in the same position.

An alternative to pre-heating of the thermoplastic polymer layer 16, is the use of a heated shaped tool 18 placed in contact with the thermoplastic polymer layer 16. Such contact heats the thermoplastic polymer layer to the flow-temperature such that the shaped tool 18 reprofiles the thermoplastic polymer layer 16 to form the working surface 30. Subsequent cooling of the shaped tool 18 whilst in contact with the thermoplastic polymer layer 16 causes solidification of the layer 16 such that further flow is prevented after the shaped tool 18 is removed.

The shaped tool 18 may consist of polished steel or aluminium to facilitate rapid heating or cooling of the tool 18. Furthermore, release of the steel or aluminium shaped tool 18 from the formed working surface 30 can be improved by a surface finish coating the surface of the shaped tool 20.

One particular form of the method according to the first embodiment uses a device such as a heated rigid "ironing" frame with a shape matching the desired working surface, i.e. the assembly interface. Profiling may be done while the skin is on the lay-up tool, or on a dedicated assembly preparation tool. The thermoplastic surface will be moulded by the heated profile frame to shape the surface of the part, leaving a local profiled surface identical to the required assembly interface surface, or a surface profile optimised for control of the welding process. In addition the heated frame may mould in features such as "energy directors" which enhance the flow of thermoplastic during the welding process. The heated frame may also mould in location features such as steps, conical targets, or drill pilots.

These surface features may be ones which are difficult to mould during particular normal thermosetting composite processes, for example compression moulding, autoclave curing or pultrusion, due to the geometrical requirements for the moulding process and removal of parts from the mould.

Figure 4:
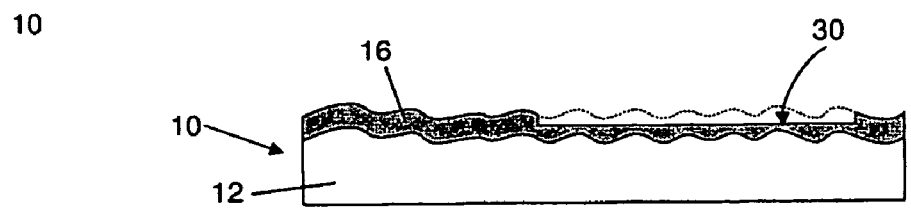
FIG. 4 is a cross-sectional view of the component of FIG. 1A undergoing re-profiling in accordance with the second embodiment of the invention.

FIG. 4 shows a method of preparing the working surface 30 in accordance with the second embodiment of the invention. In this embodiment, the re-profiling process involves the mechanical or chemical removal of selected portions of the thermoplastic polymer layer 16 to leave the working surface 30. This embodiment also encompasses ablation as a technique for removing portions of the thermoplastic polymer layer 16.

Chemical processes typically involve masking the thermoplastic polymer layer 16 such that the chemical selectively removes portions of the thermoplastic polymer layer 16 in a localised area. The mechanical approach typically involves a milling operation to achieve a working surface 30. Other operations for removing material from a localised area of a component may also be suitable.

It will be appreciated by those skilled in the art that altering at least part of the surface of a composite component in accordance with the invention, enables a precisely shaped working surface 30 to be formed.

The first and second embodiments of the invention are particularly useful with thermoset composite components 10 with a compatible thermoplastic polymer surface layer 16, e.g. a layer of polyvinylidene fluoride (PVDF), either pure PVDF or containing the PVDF in combination with other polymers and/or conventional additives, with an epoxy composite substrate. Such a thermoplastic polymer layer 16 is preferably collocated prior to, or during, curing of the thermosetting resin of the substrate 12. Processed in this manner, the thermoplastic polymer layer and thermosetting resin substrate 12 may interpenetrate to enhance the bonding between them. This processing method is disclosed in co-pending International Patent Application PCT/AU02/01014. However, other methods of attaching a thermoplastic surface to a thermosetting polymer may also be used, for example a method which involves the use of embedded fibres across the thermosetting/thermoplastic polymer interface as described in U.S. Pat. No. 5,264,059 by Jacaruso et al.

Reference to any prior art in the specification is not, and should not, be taken as an acknowledgement or any form of suggestion that this prior art forms part of the common general knowledge in Australia or any other country Experimental Discussion A stack of 10 plies of Hexcel plain-weave carbon fibre/F593-18 epoxy prepreg was placed on a flat aluminium mould. Onto this stack was placed a 0.6 mm thickness of PVDF thermoplastic polymer. The stack was enclosed within a vacuum bag, and the air within the bag evacuated. The stack was cured for 2 hours at 177° C., under 0.63 MPa external pressure. This process resulted in a cured thermoset composite laminate with an attached thermoplastic polymer surface. The cured laminate was placed under a shaped impressing tool heated to 190° C. The shaped impressing tool was pressed into the thermoplastic surface at 200 kPa pressure for 10 minutes. Subsequently the shaped impressing tool was cooled to a temperature below the melting temperature of the thermoplastic polymer. The resulting surface was depressed relative to the original surface, and a fillet of thermoplastic was formed beside the tool. The thermoplastic surface of the thermoset composite laminate retained a shape accurately complementing the shape of the shaped impressing tool.

The invention claimed is:

1. A method of creating a functional utility-surface on a thermoset composite component, including the steps of:
  fixing the position of a cured thermoset polymer composite component, the thermoset polymer composite component having a thermoplastic polymer surface layer attached to at least a portion of one surface thereof, the thermoset polymer composite component being fixed in position to allow access to the thermoplastic polymer surface layer; and shaping the thermoplastic polymer surface layer to form a functional utility-surface by performing in order the steps of:

selecting a shaped tool to provide a desired utility-surface profile to the thermoplastic polymer surface layer of the component;

heating at least a portion of the thermoplastic polymer surface layer to a temperature at which the thermoplastic polymer can be made to flow; and pressing the selected shaped tool into the thermoplastic polymer surface layer, causing the thermoplastic polymer to flow beneath the tool, around the tool or both beneath the tool and around the tool and removing the shaped tool from the thermoplastic surface layer with a functional utility surface layer formed therein, wherein the shaped tool used to form the functional utility surface in the thermoplastic polymer surface layer is a second component which is later assembled with the thermoset composite component, wherein the second component is a second thermoset polymer composite component.

2. The method according to claim 1, further including the step of subsequently cooling the thermoplastic polymer surface layer, to provide sufficient solidity to the thermoplastic polymer to retain the shape of the selected shaped tool.

3. The method according to claim 1, wherein the shaped tool is heated to a temperature above the flow-temperature of the thermoplastic polymer, the heated shaped tool heating the thermoplastic polymer surface layer.

4. The method according to claim 1 or 2, wherein the temperature of the shaped tool is at or below the solidification temperature of the thermoplastic polymer following pressing of the shaped tool against the thermoplastic polymer surface layer.

5. The method according to claim 1, wherein the shaped tool is moved across the thermoplastic polymer surface layer of the thermoset composite component or is impressed into the thermoplastic polymer surface layer of the thermoset composite component, or is both moved across the thermoplastic polymer surface layer of the thermoset composite component and impressed into the thermoplastic polymer surface layer of the thermoset composite component.

6. The method according to claim 1, wherein a portion of the thermoplastic polymer surface layer is removed to form a functional utility-surface on the thermoset composite component.

7. The method according to claim 6, wherein a portion of the thermoplastic polymer surface layer is removed by a cutting tool.

8. The method according to claim 6, wherein a portion of the thermoplastic polymer surface layer is removed by chemical means.

9. The method according to claim 6, wherein a portion of the thermoplastic polymer surface layer is removed by ablation.

10. The method according to claim 1, wherein a second component is assembled with the thermoset composite component in the region of the functional utility surface of the thermoplastic polymer surface layer.

11. The method according to claim 10, wherein the second component is assembled in situ by being cast in a liquid form into the shaped region of the functional utility surface, and solidified.

12. The method according to claim 10, wherein the functional utility-surface is shaped to locate and retain the second component without the use of additional adhesives or mechanical fasteners.

13. The method according to claim 1, wherein the second component is a second thermoset polymer composite component with a thermoplastic polymer surface layer.

14. The method according to claim 1, wherein a second component is molded into at least a part of the utility-surface during reshaping of the thermoplastic polymer surface layer.

15. The method according to claim 14, wherein the second component is a heating element, or a material that is later used to generate or concentrate heat within the thermoplastic polymer surface layer.

16. The method according to claim 14, where the second component is used to limit flow of the thermoplastic polymer surface layer, or control thickness of the thermoplastic polymer surface layer.

17. The method according to claim 14, wherein the second component is a sensor.

18. The method according to claims 1, 6 or 10, wherein identification shapes, features or objects are incorporated into the thermoplastic polymer surface layer.

19. The method according to claim 1, wherein the thermoplastic polymer surface layer on the thermoset composite component contains a thermoplastic polymer in combination with other materials selected from the group consisting of rubbers, particulates, fibres and scrims.

20. The method according to claim 1, wherein additional thermoplastic polymer, is added prior to or at the time of forming of the utility-surface.

21. The method according to claim 1, wherein the thermoplastic polymer is a semi-crystalline polymer.

22. The method according to claim 21, wherein the thermoplastic polymer is selected from the group consisting of pure polyvinylidene fluoride (PVDF), a thermoplastic polymer containing PVDF in combination with other polymers, other additives, other polymers and other additives, and a thermoplastic polymer including VDF monomer.

23. The method according to claim 21, wherein the selected thermoset composite component is manufactured by collocating a thermoplastic polymer with an uncured thermosetting polymer composite, and subsequently curing.

24. The method according to claim 23, wherein the thermoplastic polymer has solution compatibility with the thermosetting polymer in the composite component, allowing a semi-interpenetrating polymer network to form between the thermoplastic polymer and thermosetting polymer.

25. The method according to claim 1, wherein the thermoplastic polymer is an amorphous thermoplastic polymer.

26. The method according to claim 25, where the thermoplastic polymer is selected from the group of polyetherimides, polysulfones, polyethersulfones, and polystyrenes.

27. A method according to any of claim 1, 6 or 10, wherein the selected cured thermoset composite component comprises at least one thermosetting resin selected from the group consisting of epoxies, bismaleimides, polyesters, cyanate esters, and vinyl esters as a thermosetting resin.

28. A method according to any of claim 1, 6 or 10, wherein the selected cured thermoset composite component comprises carbon fibres in combination with a thermosetting resin.

29. A method according to any of claim 1, 6, or 10, wherein the selected cured thermoset composite component comprises glass fibres in combination with a thermosetting resin.

* * * * *